United States Patent [19]
Kaku et al.

[11] Patent Number: 5,077,755
[45] Date of Patent: Dec. 31, 1991

[54] DIGITAL SIGNAL PROCESSING SYSTEM IN MODEM

[75] Inventors: Takashi Kaku, Tama; Kyoko Endo, Kawasaki, both of Japan

[73] Assignee: Fujitsu Limited, Kawasaki, Japan

[21] Appl. No.: 512,582

[22] Filed: Apr. 23, 1990

Related U.S. Application Data

[63] Continuation of Ser. No. 327,121, Mar. 22, 1989, abandoned.

[30] Foreign Application Priority Data

Mar. 22, 1988 [JP] Japan .................. 63-67855

[51] Int. Cl.⁵ .......................... H04B 3/04
[52] U.S. Cl. ........................ 375/14; 375/97; 455/257
[58] Field of Search ............. 375/12, 14, 16, 97, 375/98, 99, 118; 455/257; 333/18

[56] References Cited

U.S. PATENT DOCUMENTS

| | | | |
|---|---|---|---|
| 4,376,308 | 3/1983 | McNair | 375/14 |
| 4,388,724 | 6/1983 | Göckler | 375/14 |
| 4,745,625 | 5/1988 | Eyuboglu | 375/75 |
| 4,800,573 | 1/1989 | Cupo | 375/14 |
| 4,815,103 | 3/1989 | Cupo et al. | 375/14 |

*Primary Examiner*—Benedict V. Safourek
*Attorney, Agent, or Firm*—Staas & Halsey

[57] ABSTRACT

A reception signal processing system in a communication system transmitting a data under a predetermined baud-rate, including: a first unit operated by a first frequency for inputting the reception signal and for recovering loss components in the reception signal; a second unit operatively connected to the first unit and for responding to an output of the first unit, for determining a first ideal reception signal corresponding to the output of the first unit based on a second frequency corresponding to the baud-rate, and the first frequency being higher than the second frequency; and a third unit operatively connected to the first unit and second unit for responding to the first ideal reception signal from the second unit based on the frequency and for generating and providing a second ideal reception signal based on the first frequency to the first unit; the second ideal reception signal being derived by processing the first ideal reception signal based on the first frequency, and the first ideal reception signal corresponding to the data transmitted.

7 Claims, 11 Drawing Sheets (ROF=100%)

ROF = α/ℓ ×100%

(ROF=100%)

DIGITAL SIGNAL PROCESSING SYSTEM IN MODEM

This is a continuation of copending application(s) Ser. No. 07/327,121 filed on Mar. 22, 1989, now abandoned.

BACKGROUND OF THE INVENTION

1. Field of the Invention

The present invention relates to a digital signal processing system provided in a modulator/demodulator (below, modem) for use in a digital data transmission network. More particularly, it is relates to a digital signal processing system for compensating a base band signal or pass band signal received in the modem using a predetermined sampling frequency.

An output of the digital signal processing system is supplied to a personal computer, a facsimile apparatus and the like through the digital data transmission network.

2. Description of the Related Art

A digital signal processing technique is widely utilized in the field of information processing. In general, first, a digital signal is converted to a base band signal based on a Nyquist rate, second, the base band signal is wave-shaped by a filter and also converted to a pass band signal based on a modulation method in the modem, third, the pass band signal is transmitted to another modem through the analog or digital data transmission network, fourth, the pass band signal is converted to the original base band signal (demodulation), and last, the base band signal is recovered in the other modem.

The modem mainly has two functions, i.e., the modulation and demodulation as explained above. Further, the type of the modem can be classified into high speed modems and low speed modems based on the processing speed. Low speed modems are mainly used for frequency shift keying (FSK) at a data transmission speed lower than 1200 bps (bit per second). By contrast, high speed modems are mainly used for phase shift keying (PSK) or quadrature amplitude modulation (QAM) at a data transmission speed higher than 2400 bps.

In the demodulation process, it is necessary to compensate phase jitter distortion contained in the pass band signal, particularly, in a low speed modem.

One example of a digital signal processing system, "An Automatic Equalizing Method and System" by Noriaki Fujimura, is disclosed in U.S. Pat. No. 4,097,807. This method is used for a suppressed carrier data transmission system for automatically compensating amplitude for static and dynamic variations in the phase, delay and frequency characteristics of a transmission channel in a high speed data transmission.

As an another example, "Joint Equalization and Carrier Recovery Adaptation in Data Transmission Systems" by Falconer is disclosed in U.S. Pat. No. 3,878,468. This prior art shows a pass band system and base band system. Both pass band and base band systems can be adapted to a low frequency system as mentioned above.

SUMMARY OF THE INVENTION

The object of the present invention is to provide a reception signal processing system which can operate at a low frequency for suppressing the phase jitter caused by a power source.

Another object of the present invention is to provide a digital signal processing system in a modem for enabling suppression of phase jitter at high frequencies contained in a base band signal or pass band signal when the received signal is processed in the modem by using a predetermined sampling frequency the same as baud-rate frequency or a frequency higher than the baud-rate frequency.

In accordance with the present invention, there is provided a reception signal processing system in a communication system transmitting a data under a predetermined baud-rate, including: a first unit operated by a first frequency for inputting the reception signal and for recovering loss components in the reception signal; a second unit operatively connected to the first unit and for responding to an output of the first unit, for determining a first ideal reception signal corresponding to the output of the first unit based on a second frequency corresponding to the baud-rate, and the first frequency being higher than the second frequency; and a third unit operatively connected to the first unit and second unit for responding to the first ideal reception signal from the second unit based on the frequency and for generating and providing a second ideal reception signal based on the first frequency to the first unit; the second ideal reception signal being derived by processing the first ideal reception signal based on the first frequency, and the first ideal reception signal corresponding to the data transmitted.

Further, a digital signal processing system in a modem, including: an equalization circuit operated by a predetermined sampling frequency for compensating an amplitude and a delay distortion of a base band signal demodulated from a reception signal or pass band signal in the modem; a carrier phase control circuit operatively connected to the equalization circuit and operated by the predetermined sampling frequency for correcting a phase shift of the base band signal; a decision circuit operatively connected to the carrier phase control circuit and operated by a predetermined baud-rate frequency for generating decision data from the base band signal; a frequency conversion circuit operatively connected to the decision circuit for converting a sampling frequency of the decision data to the predetermined sampling frequency; and a calculation circuit operatively connected between the carrier phase control circuit and the decision for obtaining a difference signal between an output of the frequency conversion circuit and an output of the carrier phase control circuit, the difference signal being fed back to the equalization circuit and the carrier phase control circuit so that the difference signal becomes zero.

Still further, in one aspect of the present invention, the frequency conversion circuit comprises: a delay element for delaying the decision data and outputting delayed decision data, the decision data obtained from the base band signal demodulated from the reception signal having a roll-off rate of 100%; a second decision circuit for inputting the decision data and the delayed decision data, obtaining an intermediate point between present decision data and delayed decision data just before the present decision data, and outputting intermediate decision data; and a switching circuit for switching between the decision data and the intermediate decision data, and obtaining a signal of twice the baud-rate frequency used as a sampling signal having the predetermined sampling frequency.

Still further, in another aspect of the present invention, the frequency conversion circuit comprises an interpolator for generating a sampling signal having the predetermined sampling frequency based on the decision data.

DESCRIPTION OF THE PREFERRED EMBODIMENTS

Before describing the preferred embodiments, the explanations will be given of a conventional digital signal processing system and problems thereof.

Figure 1:
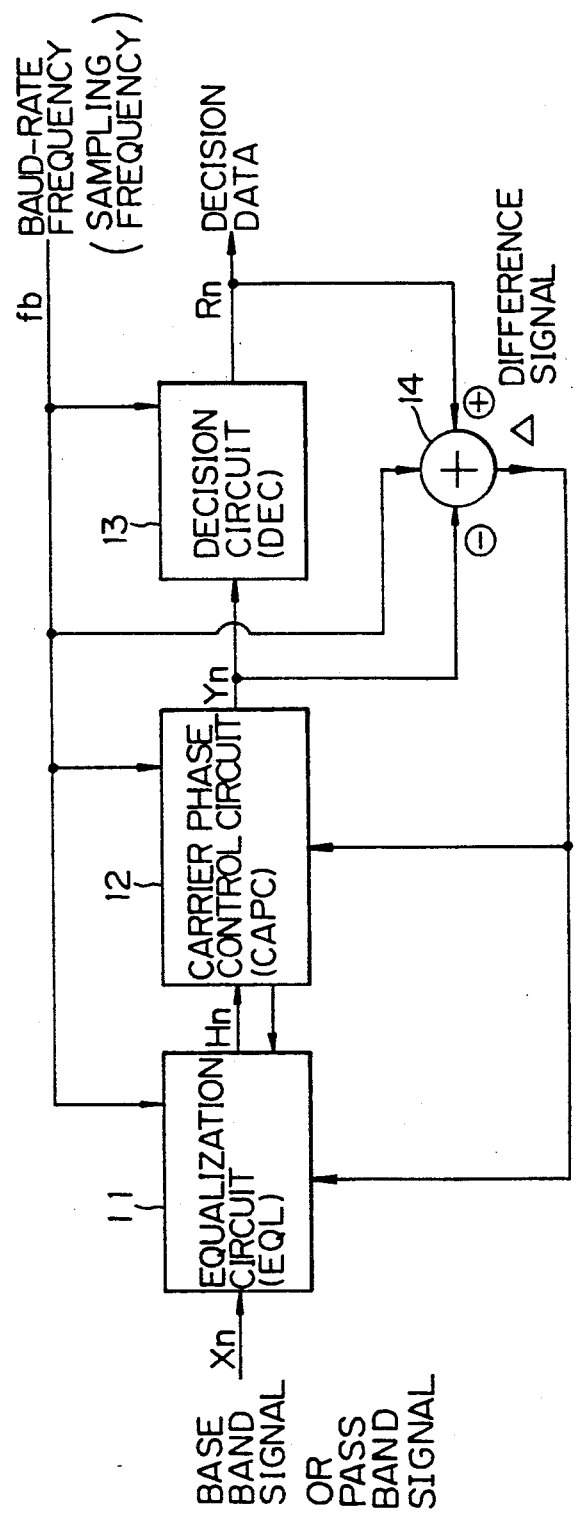
FIG. 1 is a schematic block diagram of a conventional digital signal processing system provided in a modem.

FIG. 1 is a schematic block diagram of a conventional digital signal processing system provided in a modem. In FIG. 1, 11 denotes an equalization circuit (EQL), 12 a carrier phase control circuit (CAPC), 13 a decision circuit and 14 a calculation circuit. Further, Xn is a base band signal or pass band signal input into the equalization circuit 11.

Figure 15:
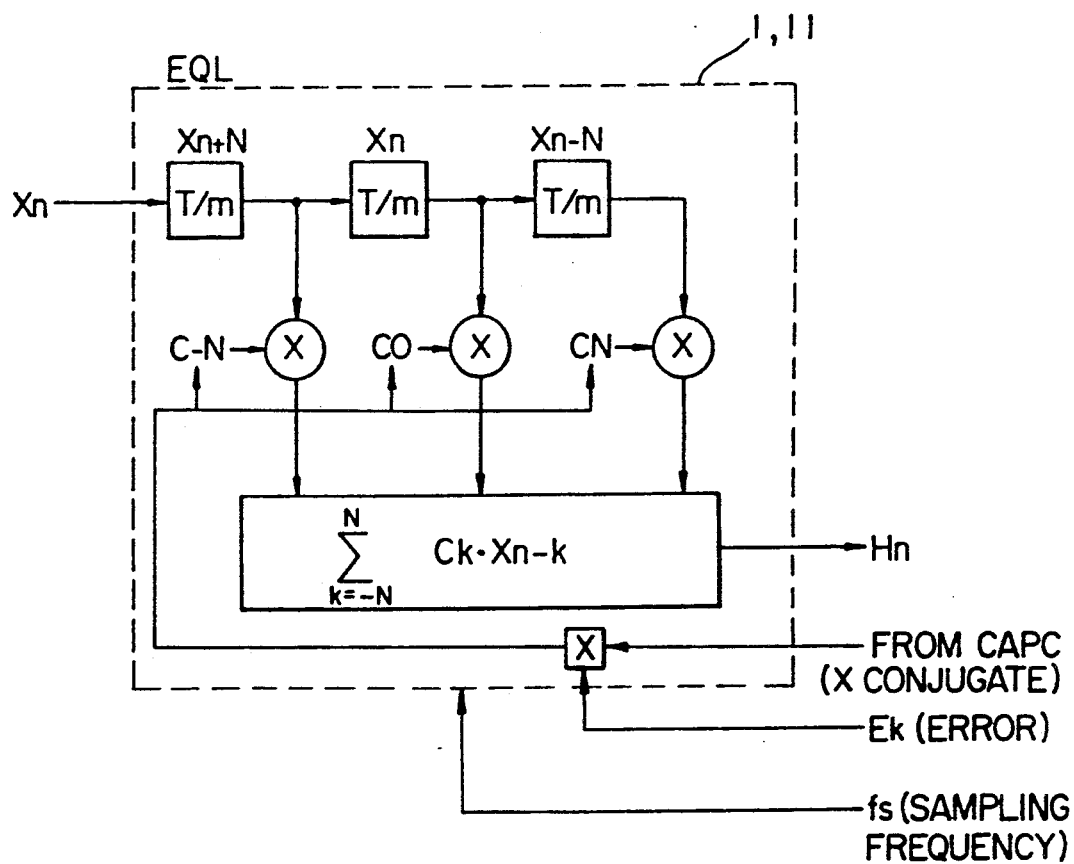
FIG. 15 is an example of an equalization circuit shown in FIGS. 2, 3 and 8.
Figure 16:
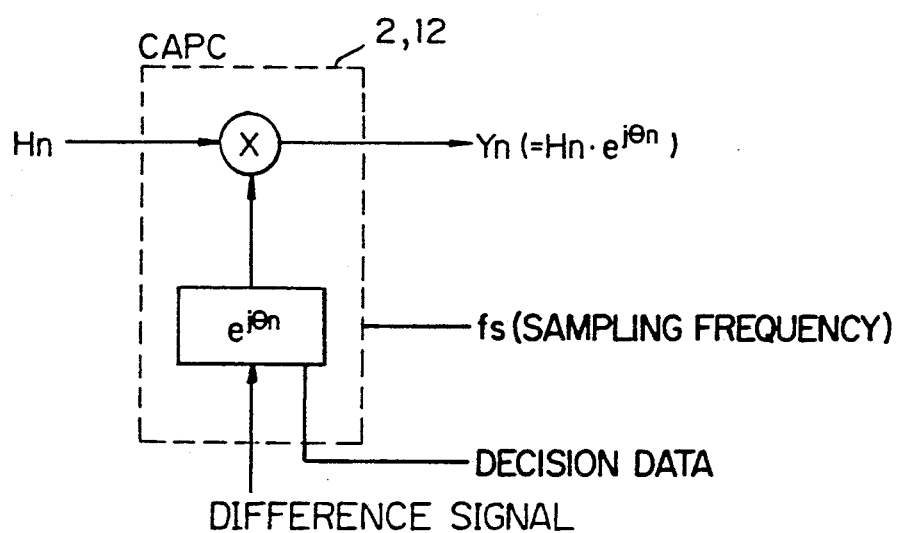
FIG. 16 is an example of a carrier phase control circuit shown in FIGS. 2, 3 and 8.

The equalization circuit 11 compensates for amplitude and delay distortion of the base band signal or pass band signal Xn demodulated in the modem, and outputs an equalization signal Hn. One example of the equalization circuit 11 is shown in FIG. 15. The carrier phase control circuit 12 receives the equalization signal Hn and corrects for phase shift of the equalization signal Hn and outputs a correction signal Yn. One example of the carrier phase control circuit 12 is shown in FIG. 16.

The decision circuit 13 receives the correction signal Yn, extracts the data from the correction signal Yn and outputs decision data Rn. The calculation circuit 14 receives the decision data Rn, and the output Yn of the CAPC 2 based on the baud-rate frequency. At the baud-rate frequency, the circuit 14 calculates the difference between the decision data Rn and the correction signal Yn. The difference signal Δ between the signal Rn and the signal Yn is fed back to the equalization circuit 11 and the carrier phase control circuit 12 so that the difference signal becomes zero.

The digital signal processing system shown in FIG. 1 thus is generally operated in accordance with the baud-rate frequency fb input into the equalization circuit 11, the carrier phase control circuit 12, the decision circuit 13, and the calculation circuit 14.

In the low speed modem, for example, the frequency 150 Hz is used as the baud-rate frequency of the transmission in V.34 of the CCITT recommendation. Accordingly, when the sampling frequency used for the base band signal Xn as applied to the equalization circuit 11 and the carrier phase control circuit 12, is equal to the baud-rate frequency fb (for example, fb=150 Hz), it is possible to only suppress the phase jitter generated under 75 Hz because the carrier phase control circuit 12 operates in accordance with the baud-rate frequency fb as the sampling frequency. By contrast, in the high speed modem, it is possible to suppress the phase jitter at very high frequencies because the sampling frequency applied to the carrier phase control circuit 12 is very high.

Phase jitter also occurs at double or three times of the frequency (100 Hz or 150 Hz) of a power source frequency (for example, 50 Hz) in the low speed modem. However, the phase jitter at the above frequencies cannot be suppressed because half of the sampling frequency is under 75 Hz.

Figure 2:
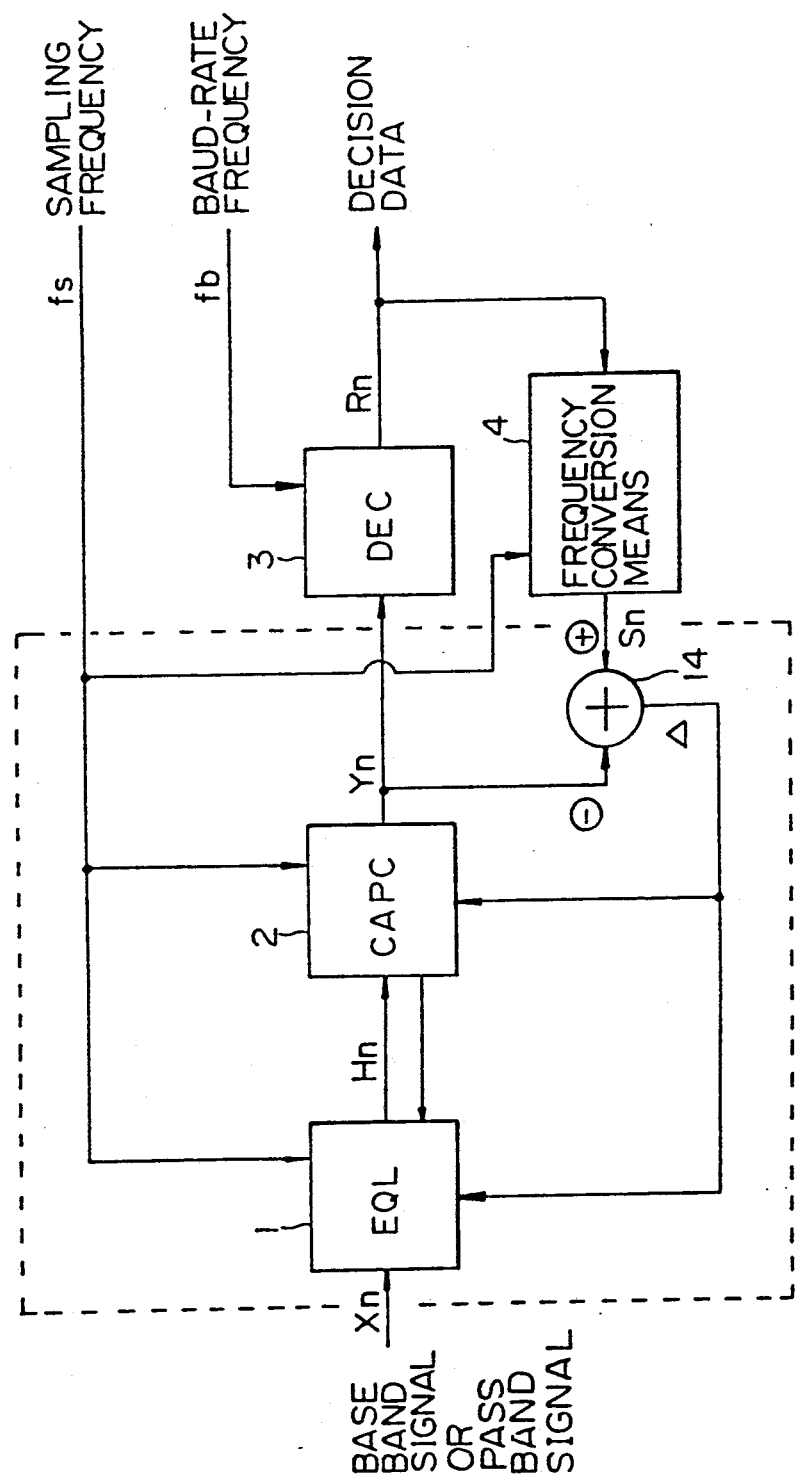
FIG. 2 is a basic block diagram of a digital signal processing system according to the present invention.

FIG. 2 is a basic block diagram of a digital signal processing system according to the present invention. In FIG. 2, reference number 1 denotes an equalization circuit, 2 a carrier phase control circuit, and 3 a decision circuit. Reference number 4 denotes a frequency conversion means according to the present invention for converting the sampling frequency of the decision data Rn to a higher frequency used as the sampling frequency.

In this system, although the equalization circuit 1 and the carrier phase control circuit 2 are operated by the sampling signal having the frequency fs, the decision circuit 3 be operated by the baud-rate frequency fb. Accordingly, it is necessary to convert the frequency of the decision data Rn to the sampling frequency fs to obtain the difference signal Δ and feed back the difference signal Δ to the equalization circuit 1 and the carrier phase control circuit 2. The sampling frequency in this system can be converted to a frequency at least double the baud-rate frequency as explained hereinafter.

Figure 3:
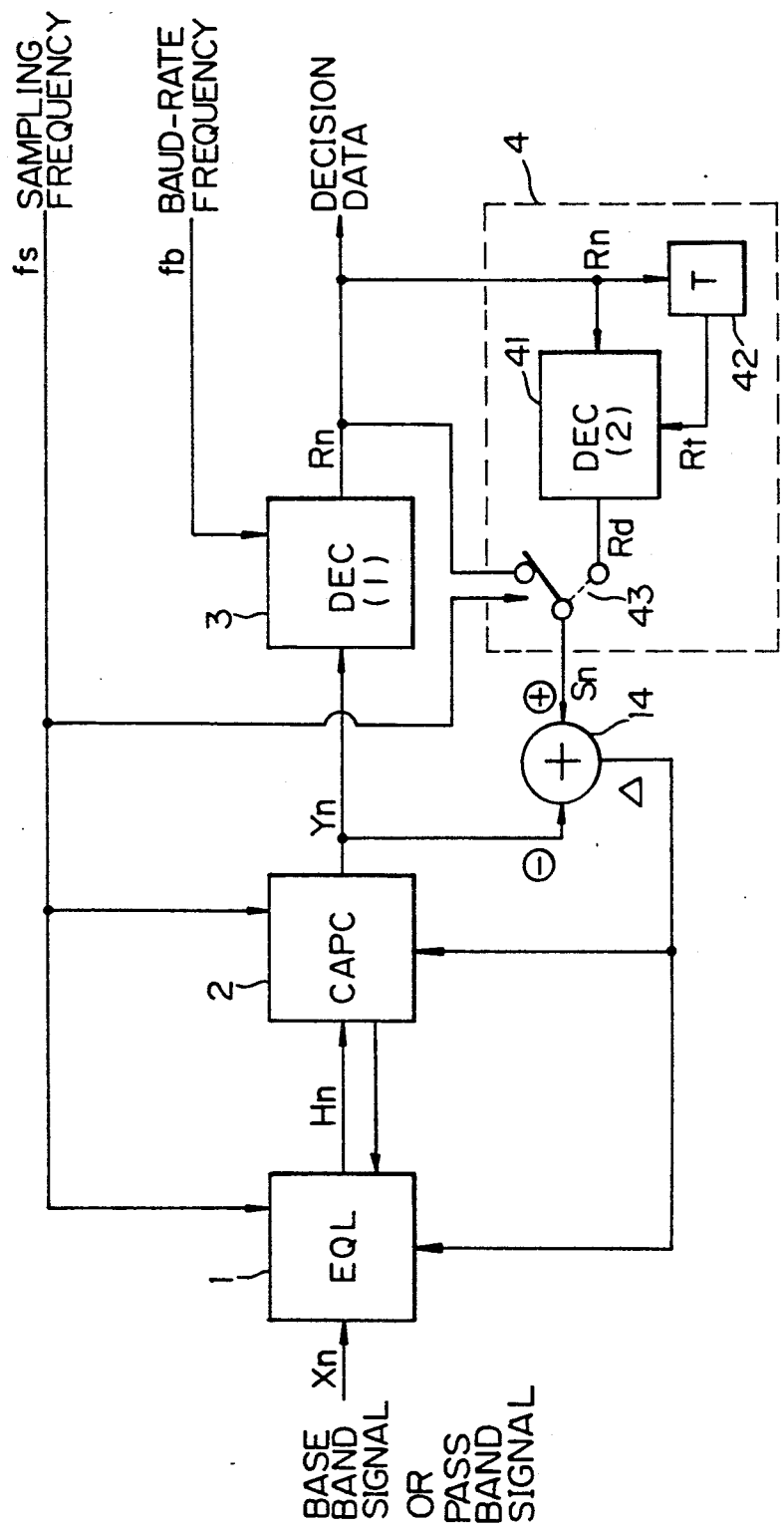
FIG. 3 is a schematic block diagram of a digital signal processing system according to an embodiment of the present invention.

FIG. 3 is a schematic block diagram of a digital signal processing system according to an embodiment of the present invention. In FIG. 3, the frequency conversion means is constituted by a second decision circuit 41 for obtaining a frequency double the baud-rate frequency fb as the sampling frequency fs, a delay element (T) 42 having a register for delaying decision data Rn, and a switching device 43 for switching the decision data Rn and the intermediate decision data Rd and obtaining the sampling signal Sn having a frequency double the baud-rate frequency fb. In this case, the frequency conversion means 4 of this embodiment is applied to the base band signal Xn demodulated from the reception signal having a roll-off (ROF) rate of 100%.

The operation of the digital signal processing system according to the present invention is explained in detail hereinafter.

In FIG. 3, the first decision circuit ("DEC(1)") 3 generates the decision data Rn after deciding the correction signal Yn. The decision of the correction signal Yn in the decision circuit 3 is performed by comparing an ideal point of reception with a reception point corrected by the carrier phase control circuit 2 on a complex coordinate.

Figure 4:
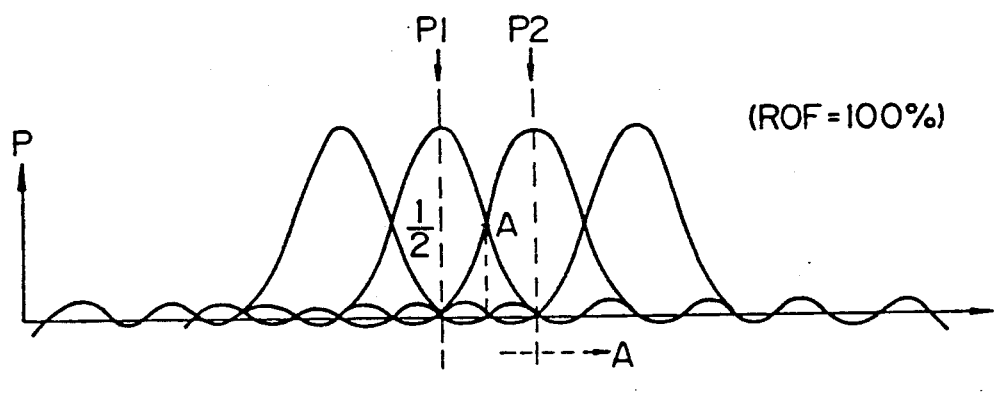
FIG. 4 is a view for explaining an intermediate point of an impulse response curve.

The second decision circuit ("DEC(2)") 41 in the frequency conversion means 4 calculates an intermediate point A (see, FIG. 4) between the decision data Rn from the decision circuit 3 and the before decision data Rt delayed by the delay element 42 as explained in detail in FIG. 4. The switching device 43 generates the sampling signal Sn having a double baud-rate frequency by alternately switching the decision data Rn and the intermediate decision data Rd. The sampling signal Sn is input into the calculation circuit 14 and the difference signal Δ between the correction signal Yn and the sampling signal Sn is fed back to the equalization circuit 1 and the carrier phase control circuit 2 so that the difference signal becomes zero. Accordingly, it is possible to compensate the amplitude and delay of the base band signal Xn demodulated from the reception signal, and to correct the phase distortion in the equalization circuit 1 and the carrier phase control circuit 2 based on the difference signal Δ.

FIG. 4 is a view for explaining the intermediate point of the impulse response curve. "P2" denotes the point of the present decision data Rn and "P1" denotes the point just before decision data Rn. "A" denotes the intermediate point and "P" the amplitude. The point A is located at half of the amplitude P. The sampling frequency fs having a double baud-rate frequency can be obtained by switching the switching device 43 as explained below.

Figure 5:
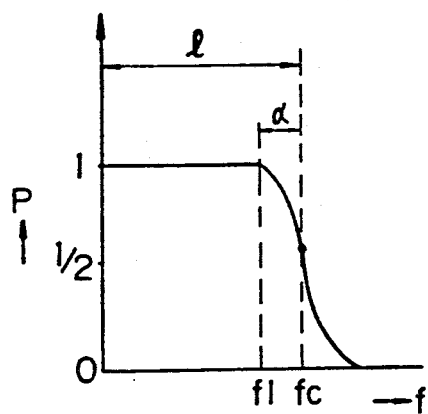
FIGS. 5 and 6 are curves for explaining a roll-off rate.
Figure 6:
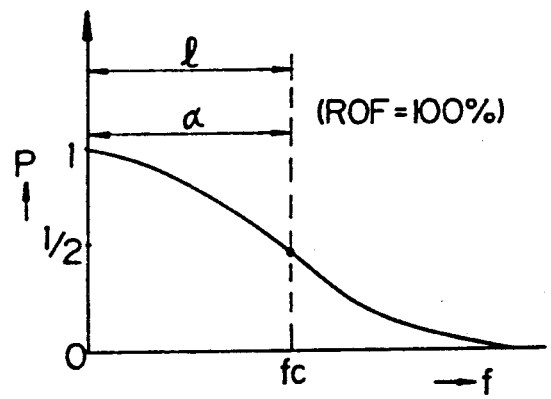

FIG. 5 and 6 are curves for explaining the roll-off rate (ROF). The roll-off rate ROF can be expressed by following formula.

$$ROF = (\alpha/l \times 100\%)$$

where, "l" is a frequency from "0" to "fc" (fc denotes a half amplitude point), and $\alpha$ is the difference in frequency from "l", to "fc" (fl denotes a trailing edge of the amplitude curve). Accordingly, when the frequency interval "l" is equal to the frequency interval "$\alpha$" as shown in FIG. 6, the roll-off rate ROF become 100% based on the above formula. Each of the impulse response curves shown in FIG. 4 has a roll-off rate of 100%.

Three roll-off filters are provided in the system. That is, the first roll-off filter (ROF 1) is provided in the transmission system. The second roll-off filter (ROF 2) is provided for the inner or previous stage of the equalization circuit 1 in the reception system. The third roll-off filter (ROF 3) is provided in the interpolator shown in FIG. 8. The relationship among these roll-off filters is given by:

$$ROF1 \times ROF2 = ROF3$$

Figure 7:
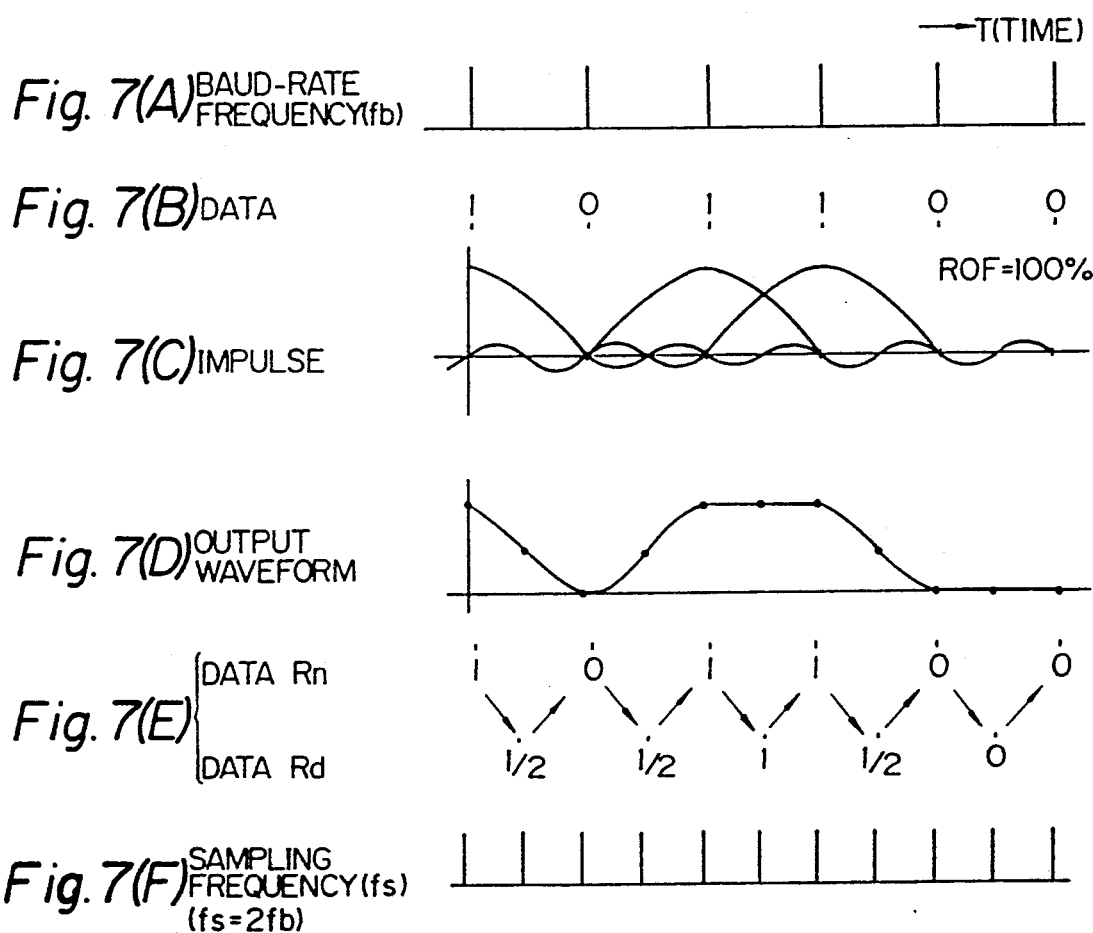
FIGS. 7(A) to 7(F) are waveforms is a view for explaining a sampling frequency having a double baud-rate frequency.

FIG. 7 is a view for explaining the sampling frequency of double the baud-rate frequency. The waveform of FIG. 7(A) denotes a baud-rate frequency fb, for example, fb=150 Hz. The baud-rate frequency fb is expressed by a reciprocal of the modulation rate. FIG. 7(B) denotes a digital data train to be transmitted at the baud-rate frequency fb. FIG. 7(C) denotes impulse response curves each having a roll-off rate of 100%, corresponding to the digital data. FIG. 7(D) denotes a curve obtained by the connection of each of the points of the decision data from the decision circuits 3 and 41. FIG. 7(E) denotes the resultant digital data from decision circuits 3 and 41. The data Rn is obtained from the decision circuit 3 and the data Rd from the decision circuit 41. FIG. 7(F) denotes the sampling frequency fs. As is obvious, the sampling frequency fs is given by a frequency double the baud-rate frequency fb shown in FIG. 7(A).

As explained above, in this embodiment, the base band signal demodulated from the reception signal or pass band signal having a roll-off rate of 100% can be processed by the sampling signal fs having double the baud-rate frequency fb. Accordingly, it is possible to easily suppress the phase jitter caused by the doubling of the power source frequency, based on the higher sampling frequency than the baud-rate frequency.

Figure 8:
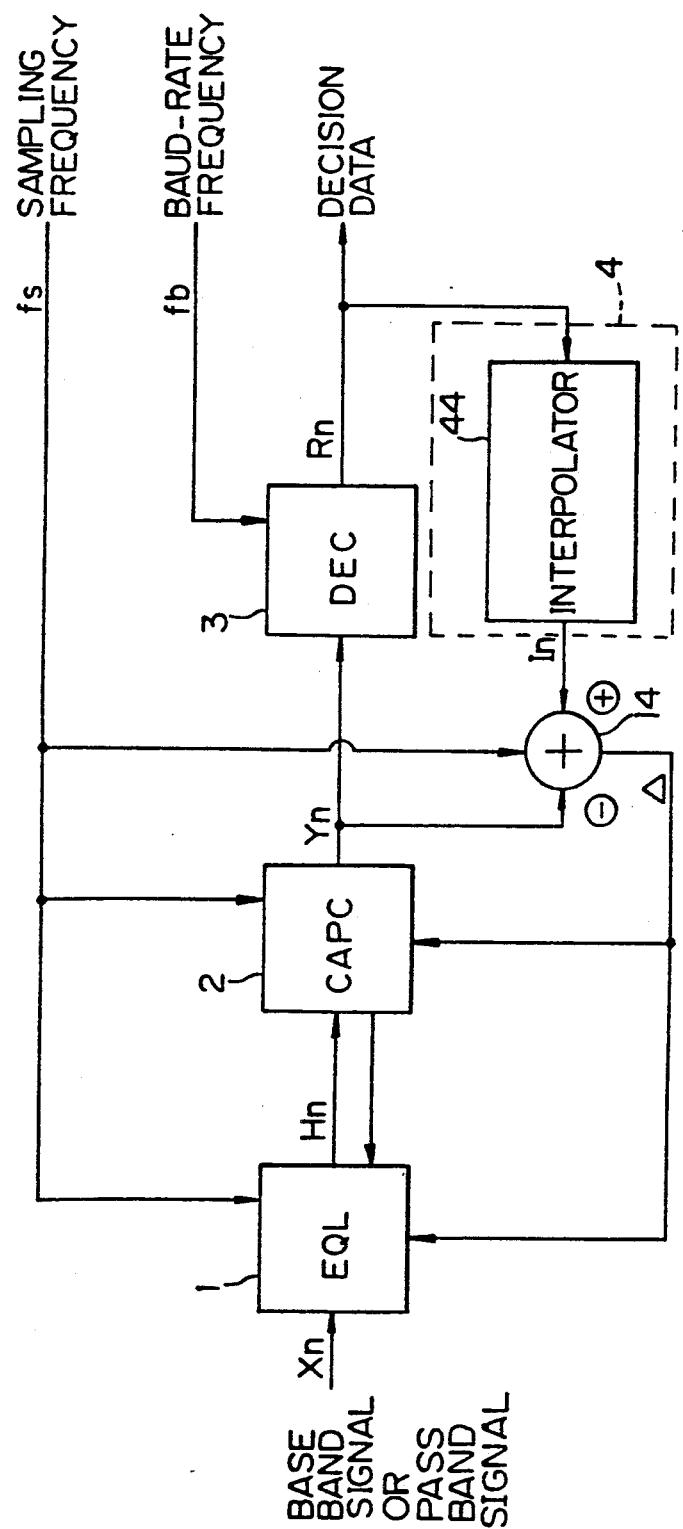
FIGS. 8 is a schematic block diagram of a digital signal processing system according to another embodiment of the present invention.
Figure 10:
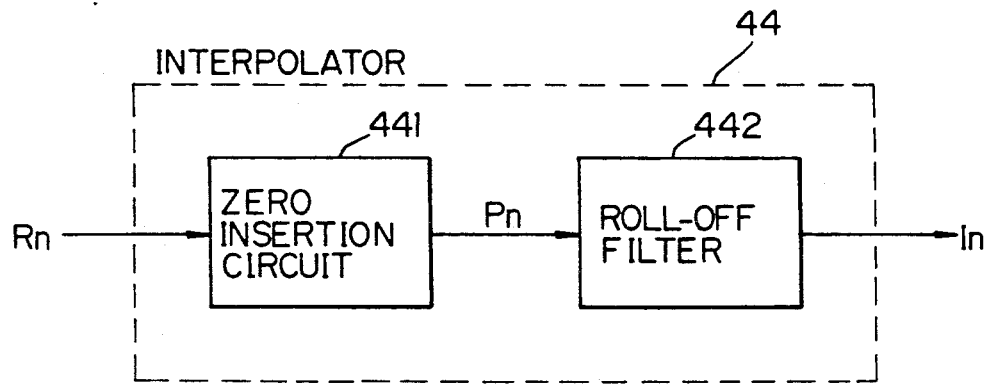
FIG. 10 is a detail block diagram of an interpolator shown in FIG. 8.
Figure 11:
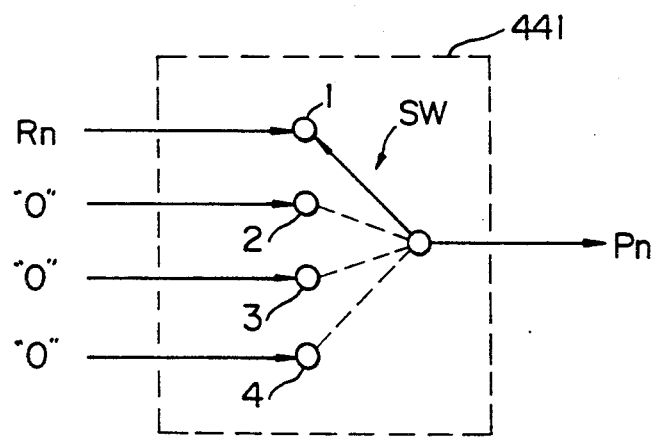
FIG. 11 is one example of a zero insertion circuit shown in FIG. 10.
Figure 13:
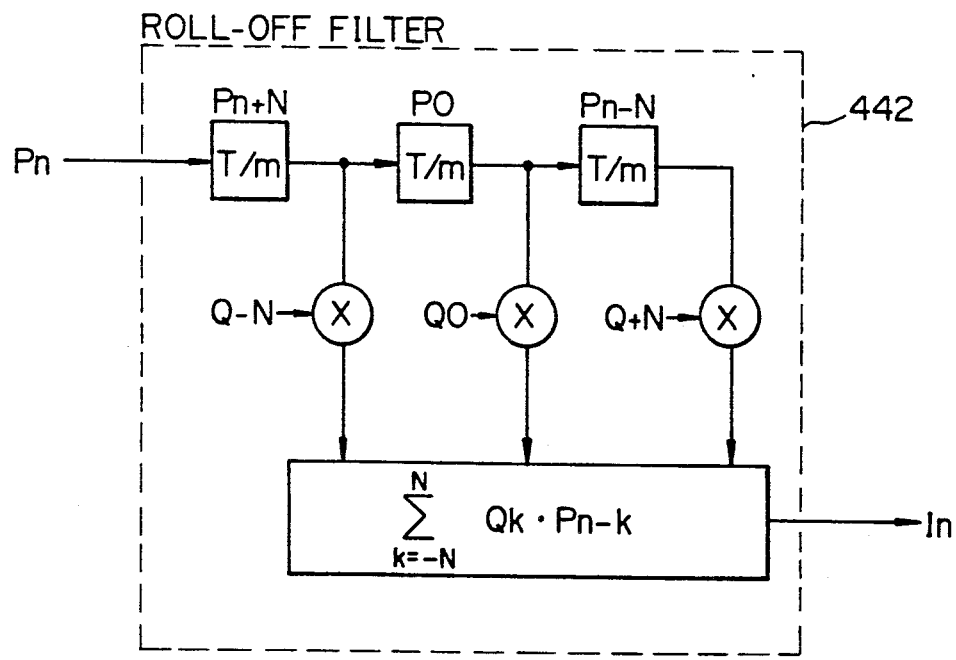
FIG. 13 is one example of a roll-off filter shown in FIG. 10.

FIG. 8 is a schematic block diagram of a digital signal processing system according to another embodiment of the present invention. In FIG. 8, the frequency conversion means 4 of this embodiment is constituted by an interpolator 44. The frequency conversion means 4 of this embodiment is applied to the base band signal demodulated from the reception signal regardless of the previous roll-off filters (ROF 1) and (ROF 2). The interpolator 44 operates as a filter and generates a sampling signal higher than the baud-rate frequency by multiplying the decision data Rn from the decision circuit 3. The details of the interpolator 44 are shown in FIGS. 10, 11 and 13. The signal Rn is input to the zero insertion circuit 441, and the output Pn of the circuit 441 is input to the roll-off filter 442. The multiplication is performed in the filter 442 as shown in FIG. 13. The calculation circuit 14 calculates the difference signal between the correction signal Yn and the output In from the interpolator 44, and the difference signal Δ is fed back to the equalization circuit 1 and the carrier phase control circuit 2 so that the difference signal becomes zero.

Figure 9:
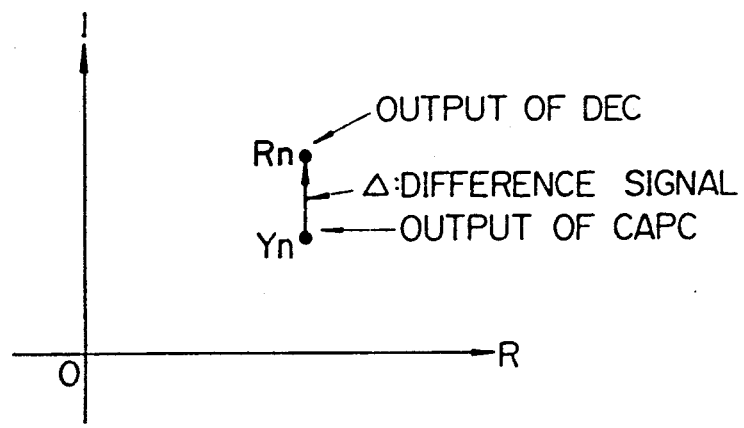
FIG. 9 is a view for explaining a difference signal output from a calculation circuit shown in FIGS. 2, 3 and 8.

FIG. 9 is a view for explaining the difference signal output from the calculation circuit 4 shown in FIGS. 2, 3 and 8. In FIG. 9, the ordinate is an imaginary part, and the abscissa is a real part. The reference "Rn" is the output of the decision circuit 3 and Yn is the output of the carrier phase control circuit 2. The symbol Δ is the difference signal between the output Rn and the output Yn. It is necessary to reduce the difference signal by feeding back the difference signal to the equalization circuit 1 and the carrier phase control circuit 2.

FIG. 10 is a detail block diagram of the interpolator shown in FIG. 8. In FIG. 10, 441 is a zero insertion circuit, and 442 is a roll-off filter. The zero insertion circuit 441 receives the decision data Rn from the decision circuit 3, and outputs a switch signal Pn. The roll-off filter 442 receives the switch signal Pn, and outputs a filtered output In.

Figure 12:
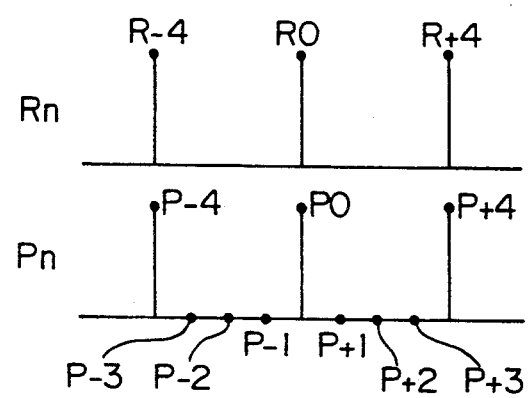
FIG. 12 is a view for explaining the relationship between decision data and a switch signal.

FIG. 11 is one example of the zero insertion circuit, and FIG. 12 is a view for explaining the relationship between the decision data Rn and the switch signal Pn. In FIG. 11, the zero insertion circuit is constituted by a switching means SW having a plurality of terminals corresponding to the sampling number. When the switch is positioned at the terminal 1, the decision signal Rn is output from the circuit 441 as the switch signal Pn.

When the switch is switched to other positions, the switch signal Pn becomes "0" as shown in FIG. 12.

Figure 14:
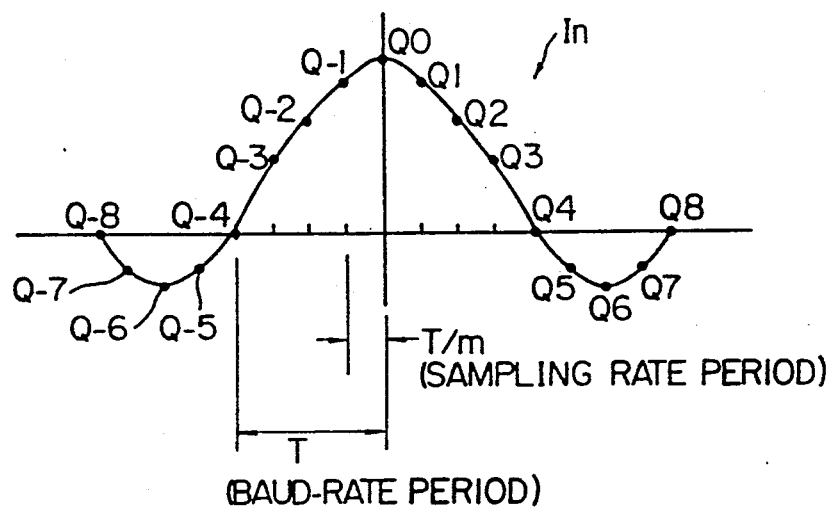
FIG. 14 is a view for explaining a filtered signal In shown in FIG. 13.

FIG. 13 is one example of the roll-off filter 442, and FIG. 14 is a view for explaining the filtered signal In. In FIG. 13, the roll-off filter 442 is constituted by a transversal type filter. The switch signal Pn is input into a first delay element T/m, and transferred sequentially and after a predetermined delay time (t/m) to each successive delay element T/m. Qk are the coefficients of the roll-off filter 442, and the coefficients Qk are multiplied by the outputs of the at respective delay elements T/m. The filtered signal In is given by the sum of the multiplication terms $Qk \times Pn-k$ (where $k = -N$ to $+N$). In FIG. 14, T is the baud-rate period, and T/m is the sampling rate period. For example, when the baud-rate period is 2400 bps and the sampling rate is 9600 bps, T/m is given by T/4. Accordingly, m/T denotes the sampling frequency. The curve shown in FIG. 14 shows the filtered signal In at each coefficient Qk.

FIG. 15 is one example of the equalization circuit 1 constituted by the transversal type filter having a shift register. This circuit is mainly used for compensating the signal delay distortion and the amplitude distortion on the line. The base band signal or pass band signal Xn is input to the first delay element T/m, and the input signal is sequentially transferred, after the predetermined delay in each delay element T/m, to the successive delay elements T/m. Ck (for $k = k = -N$ to $+N$) are the tap coefficients at the respective delay elements T/m and each is multiplied by each output of the corresponding delay element T/m. The equalization signal Hn is given by the result of the multiplication $Ck \times Xn-k$. In this case, Co is a center tap.

FIG. 16 is an example of the carrier phase control circuit for correcting the phase shift of the carrier. The equalization signal Hn is multiplied by the coefficient $e^{j\theta n}$, and outputs the correction signal Yn.

Figure 17:
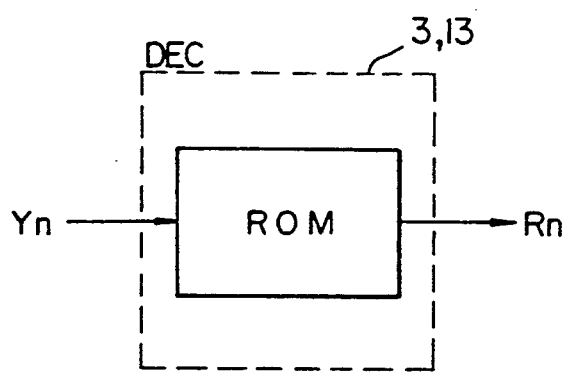
FIG. 17 is an example of a decision circuit shown in FIGS. 2, 3 and 8.

FIG. 17 is an example of the decision circuit 3. In FIG. 17, the decision circuit 3 is constituted by a read only memory ROM having a predetermined table. The decision data Rn is stored in the table an is read out by appropriate addressing of the ROM in response to the correction signal Yn supplied as an input.

We claim:

1. A reception signal processing system in a communication system which transmits data as a data signal at a fixed baud-rate, the reception signal processing system receiving the transmitted data signal as a reception signal and comprising:

first means operated by a first frequency for receiving said reception signal and for recovering loss components in said reception signal and producing a first output;

second means, operatively connected to said first means, for receiving said first output of said first means and, in response thereto, determining and producing as an output thereof a first ideal reception signal corresponding to said transmitted data and based on a second frequency corresponding to said fixed baud-rate, said first frequency being higher than said second frequency; and third means, operatively connected to said first means and said second means, for receiving said first ideal reception signal from said second means based on said second frequency, and for processing said received first ideal reception signal based on said first frequency and thereby generating in response thereto, and providing as an output, a second ideal reception signal based on said first frequency and supplied to said first means.

2. A reception signal processing system as claimed in claim 1, wherein said first means further comprises:

static signal loss compensating means for compensating for signal loss depending on line static frequency characteristics in operative response to said output of said third means and producing a corresponding output; and carrier automatic phase control means, operatively connected to said static signal loss compensating means, for receiving and correcting signal phase error of said static signal loss compensating means output by operatively responding to said output of said third means and predicting a signal phase of said output of said static signal loss compensating means.

3. A reception signal processing system as claimed in claim 2, wherein:

said reception signal is a pass band signal;

said static signal loss compensating means is operated by a pass band frequency; and said carrier automatic phase control means includes a demodulator.

4. A reception signal processing system as claimed in claim 2, wherein:

said reception signal is a base band signal;

said static signal loss compensating means is operated by a base band frequency.

5. A digital signal processing system in a modem for processing a reception signal corresponding to a data signal transmission received thereby and having a fixed baud-rate defining a baud-rate frequency, the reception signal comprising one of a base band signal demodulated from the received data signal transmission or a pass band signal, the digital signal processing system comprising:

equalization means for receiving the reception signal and operated by a first sampling frequency, for compensating for amplitude and delay distortion of the reception signal and producing a first output signal;

carrier phase control means, operatively connected to said equalization means and operated by said first sampling frequency, for receiving the first output signal of said equalization means and correcting a phase shift of said base band signal, and for producing a second, phase shift corrected output signal;

decision means, operatively connected to said carrier phase control means and operated by said baud-rate frequency as a data sampling frequency, for receiving said second, phase shift corrected output signal of said carrier phase control means and generating, and producing as an output in response thereto, decision data corresponding to the data of the received data signal transmission;

frequency conversion means, operatively connected to said decision means, for receiving the decision data output of said decision means and converting said data sampling frequency to said first sampling frequency, said first sampling frequency being higher than said data sampling frequency; and calculation means, operatively connected to and receiving said outputs of said carrier phase control means and said decision means, respectively, for calculating a difference signal representing the difference between said respectively received outputs of said frequency conversion means and of said carrier phase control means and producing a difference signal output; and means for feeding said difference signal output back to said equalization means and/or said carrier phase control means and said equalization means and said carrier phase control means selectively responding to said difference signal fed back thereto, selectively and respectively as to said amplitude and delay distortion compensating and phase shift correcting functions thereof, so that said difference signal becomes zero.

6. A digital signal processing system as claimed in claim 5 and including means defining a roll-off rate of 100% of said reception signal, wherein said frequency conversion means comprises:

means for receiving said decision data output of said decision means and delaying said decision data by a time interval having a fixed relationship to the period of the baud-rate frequency and producing a delayed decision data output;

second decision means for receiving said decision data and said delayed decision data outputs, for defining an intermediate point between a present decision data and a delayed decision data, just before said present decision data, of said respective outputs and for generating a corresponding, intermediate decision data output; and switching means for receiving and switching between said decision data and said intermediate decision data outputs and thereby obtaining a frequency double said baud-rate frequency and for producing the frequency double said baud-rate frequency as an output comprising said first sampling frequency.

7. A digital signal processing system as claimed in claim 5, wherein said frequency conversion means comprises an interpolator.

* * * * *

UNITED STATES PATENT AND TRADEMARK OFFICE
CERTIFICATE OF CORRECTION

PATENT NO. : 5,077,755

DATED : December 31, 1991

INVENTOR(S) : Takashi KAKU et al.

It is certified that error appears in the above-identified patent and that said Letters Patent is hereby corrected as shown below:

Col. 1,   line 13,   delete "is".

Col. 3,   line 19,   delete "is a view".

Col. 4,   line 1,    delete ",";
          line 47,   change "be" to --is--.

Col. 6,   line 44,   change "4" to --14--.

Col. 7,   line 11,   delete "at";
          line 42,   change "an" to --and--.

Signed and Sealed this

Twelfth Day of October, 1993

Attest:

BRUCE LEHMAN

Attesting Officer          Commissioner of Patents and Trademarks